June 14, 1955 — R. D. DUY — 2,710,725
FORCED CIRCULATION HOT WATER HEATING SYSTEM
Filed Dec. 4, 1952
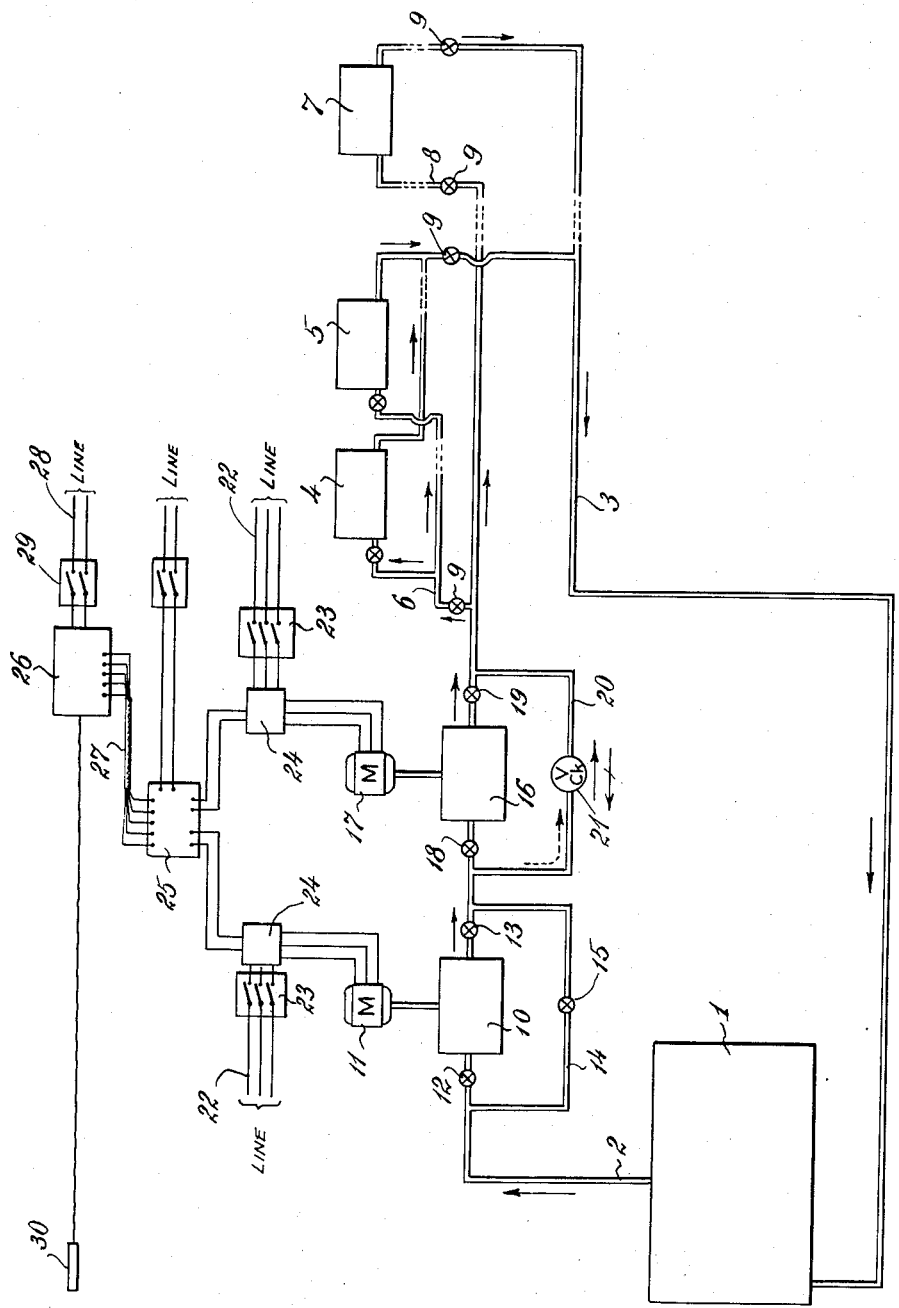
INVENTOR
Robert D. Duy
BY
Pennie Edmonds Morton Barrows Taylor
ATTORNEYS

United States Patent Office

2,710,725
Patented June 14, 1955

2,710,725

FORCED CIRCULATION HOT WATER HEATING SYSTEM

Robert D. Duy, Mendham, N. J.

Application December 4, 1952, Serial No. 323,980

4 Claims. (Cl. 237—8)

This invention relates to hot water heating systems of the forced circulation type, which include a plurality of radiators at different distances from a hot water boiler, supply and return lines, across which the radiators are connected, and pumping means for increasing the rate of circulation of the water. More particularly, the invention is concerned with a novel hot water heating system having forced circulation, which provides improved delivery of the hot water to the radiators of the system and more rapid and uniform heating of the rooms, in which the radiators are located.

The heating system of the invention may be advantageously employed for heating groups of buildings, such as garden apartments, in which the heating plant is disposed at a suitable central location and the hot water is supplied to the apartments through a supply line running from the heating plant to the most remote apartment and brought back to the heater through a return line parallel to the supply line. In such systems, radiators in each apartment are connected across the supply and return lines in one or more branch circuits in different arrangements, depending upon the layout of the apartment.

Prior heating systems of the type described are controlled in various ways, as, for example, the circulating pump may operate continuously and the temperature of the water leaving the boiler room may be regulated. For this purpose, part of the water returned to the boiler room may be mixed with the hot water leaving the boiler by means of a three-way mixing valve under the control of a thermostat, which responds to outside atmospheric temperature. A system in which this method of control is employed, is costly to operate because of the continuous operation of the pump, and it is difficult to mix the return water with the hot water issuing from the boiler to produce a mixture at the desired temperature. In another prior system, the pump operates continuously and the flow of hot water to the branch circuits feeding the radiators in each apartment is controlled by a motorized valve operated by a thermostat in one of the rooms of the apartment. A system of this kind is again expensive to operate because of the continuous operation of the pump and it is likely to require frequent attention because of damage or misadjustment of the apartment thermostats as a result of being tampered with by the tenants. If, in such a system, the thermostat in an apartment becomes inoperative with the control valve for that apartment in closed position, the radiators and connections in the apartment may freeze up in cold weather. In a third form of prior systems, the pump is started and stopped by a thermostat in a room in one of the apartments and such an arrangement is open to the objection that the entire system may become inoperative, because of damage to the thermostat, or may fail to heat the apartments properly, because the room, in which the thermostat is located, does not have the same heat loss as other rooms in the building. In addition, it is practically impossible with "on and off" operation to insure that the apartments will be uniformly heated without overheating those near the boiler room and underheating those farther away.

The present invention is directed to the provision of a forced circulation hot water system, which overcomes the objections to the prior systems above set forth and heats the apartments at a substantially uniform rate regardless of their distance from the central heating station. In the new system, the circulating means are operated intermittently in response to outside temperature conditions and, at the beginning of each heating cycle, the hot water is forced at a rapid rate under high pressure through the supply line. After an interval sufficient to insure that the hot water has reached the end of the supply line, the rate of flow of the fluid is reduced and continues for the remainder of the heating cycle at the lower rate.

For a better understanding of the invention, reference may be made to the accompanying drawing, in which the single figure is a diagrammatic layout of one form of the system and its controls.

In the system illustrated, water is heated in a boiler 1 and leaves through a supply line 2, which leads to all of the apartments to be heated. The water is returned to the boiler through a return line 3, which extends parallel to the supply line from the remote end thereof to the boiler. Radiators within the apartments are supplied with hot water from the supply line in the usual way, as, for example, radiators 4, 5 represent a group, which are connected in parallel in a branch connection 6 between the supply and return lines. Other radiators, such as that marked 7, may be individually connected by a branch connection across the supply and return lines, and other radiators may be connected in parallel with the supply line. The branch connections for supplying radiators within an apartment include valves 9, which may be set to balance the flow in the several apartments.

The circulation of water through the system is effected by a pair of pump sets, each of which includes a pump driven by a motor. Each of the pumps has the necessary capacity to circulate through the system the amount of hot water required to heat the apartments served by the system. Pump 10 of the first set is driven by motor 11 and is connected in the supply line 2 near boiler 1, the line 2 being provided with shut-off valves 12, 13 on opposite sides of the pump. A by-pass 14 containing shut-off valve 15 is connected to the supply line 2 at the remote sides of valves 12 and 13, so that, by opening valves 12, 13 and closing valve 15 in the by-pass, all flow travels through pump 10. If the pump requires adjustment or repairs, it can be cut out of the system by closing valves 12, 13 and opening the by-pass valve 15. In that event, flow through the system is effected by the second pump set, which receives hot water through by-pass 14.

The second pump set includes a pump 16 driven by a motor 17 and the pump is connected in the supply line 2 beyond the outer end of by-pass 14. The line 2 is provided with shut-off valves 18, 19 on opposite sides of pump 16 and a by-pass 20 is connected to the supply line at the remote sides of valves 18, 19. The by-pass is provided with a check valve 21, which permits forward flow around the pump, is indicated by the dotted arrow, but prevents return flow. Whenever pump 16 requires adjustment or repairs, valves 18, 19 are closed and, thereafter, flow through the system can be maintained by pump 10 with the heating fluid traveling around pump 16 through by-pass 20.

The operation of the motors of the pump sets is controlled as follows. Each motor is supplied with current from a line 22 through a switch 23, and the motors have respective magnetic starters 24 controlled by relays in a cabinet box 25, which also contains a connection panel, an adjustable timer, overload breakers, etc. The relays in the cabinet box 25 are controlled by a standard program control device 26 connected to the devices in box 25 by a group of conductors 27. The program device is operated by current from a line 28 containing a switch 29 and is controlled by a thermostat 30, which is exposed to outside atmospheric temperature.

A typical program control device, which may be used in the system, functions cyclically on an hourly basis and, at the start of each heating cycle, the device causes the relays in box 25 to energize the magnetic starters 24, so that both motors 11 and 17 operate their pumps 10, 16. The length of the period of pump operation in each cycle of an hour depends on the outside temperature and, when that temperature is at 32.5° F., for example, current for pump operation may be supplied for only 30 minutes out of an hour. As the temperature rises, the period of pump operation in each hour is shortened and, as the temperature falls, the period of operation is lengthened. The timer employed in the cabinet box 25 acts to prolong the length of the period of pump operation in each cycle, according to the adjustment of the timer, and also acts to shut down one pump set, as will be described. Normally, the timer is adjusted so that the prolongation of the period of pump operation is equal to the time required for the two pumps operating in series to circulate water from the boiler room to the most remote radiator in the heating system. Accordingly, at the start of each heating cycle, both pumps are started in operation, and, as the intake of pump 16 is connected to the discharge of pump 10, the head pressure of the water leaving pump 16 is the sum of the pressures developed by the respective pumps. Each pump may have, for example, a capacity of 200 G. P. M. of water against a head of 25 lbs., in which event, the pressure of the water leaving pump 16 will be 50 lbs. Under such a pressure, the water requires only a short time to reach the radiator in the system farthest from the boiler room.

When the water from the boiler has reached the farthest radiator, the timer causes motor 17 to shut down, and thereafter, the first pump set continues to operate for the balance of the heating period as determined by the response of thermostat 29 to the outside temperature. When that period of operation has elapsed, motor 11 is shut down and both pumps remain at rest until the start of a new heating cycle.

When the second pump set has been put out of operation by the action of the timer, the water discharged from pump 10 is free to flow either through pump 16, or the by-pass 20, but, since pump 16 at rest offers considerable resistance to the flow of fluid, the flow will be almost entirely through the by-pass. When both pump sets are operating, the part of the by-pass 20 up to the check valve 21 becomes dormant, but return flow through the by-pass to the intake of pump 16 is prevented by the check valve.

In the system of the invention, the pump sets operating in series at the beginning of each heating cycle cause the entire length of the supply line to be filled with hot water in a short time, after which the single pump set maintains the flow of hot water at a lower rate. The system thus insures substantially uniform heating of all the apartments and the shutting down of the second pump set reduces the cost of operation. Also, the provision of the second pump set makes it possible to operate the system, even though one pump set may be disabled. If either pump set is put out of operation for any reason, the control devices are adjusted appropriately to insure that the apartments most remote from the boiler will receive hot water during each heating cycle for a sufficient period to insure that those apartments will be adequately heated. If the first pump set is disabled, the timer in the cabinet box will be put out of operation, so that the second pump set will function wholly under the control of the program control device.

In the system illustrated in the drawing, the program control device 26 is in turn controlled by a thermostat 30, which is exposed to outside atmospheric temperature, and a timer is used to shut down the second pump after a period of operation of both pump sets approximately sufficient for the travel of hot water from the boiler to the outer end of the supply line. While the use of an outside thermostat for controlling the program device is preferred, it is to be understood that an indoor thermostat may be employed for the purpose. When such an indoor thermostat is used, it is normally installed in the apartment of the janitor. It is also to be understood that, while the use of a timer for shutting down the second pump set is preferred, this action may be accomplished by means of a thermostat installed in the boiler room and responding to the temperature of the water in the return line adjacent the boiler. From the start of each period of pump operation, the temperature of the return water about to enter the boiler will rise as hot water supplied to radiators returns through the return line. The temperature of the return water at the time, when the pumps have caused the hot water to reach the end of the supply line, can be determined by test and the thermostat is adjusted, so that it will operate to shut down the second pump set when the return water reaches the stated temperature. Instead of a thermostat in the boiler room responding to the temperature of the return water, it is possible to employ a thermostat responding to the temperature of the water at the outer end of the supply line, although this arrangement is less desirable.

I claim:

1. A heating system, which comprises a source of heated fluid, a supply line leading from and a return line leading to the source, a plurality of radiators connected to the supply line to receive the heated fluid therefrom, a pair of pump sets including a pair of pumps connected in series between the source and one of the lines and operable to cause a flow of fluid from the source through the supply line, a by-pass around the second pump, a check valve in the by-pass preventing return flow of fluid through the by-pass while permitting forward flow, means for starting both pump sets simultaneously, and means stopping the second pump set only after an interval approximately sufficient for the flow of fluid from the source to the end of the supply line remote from the source.

2. A heating system, which comprises a source of heated fluid, a supply line leading from and a return line leading to the source, a plurality of radiators connected to the supply line to receive the heated fluid therefrom, a pair of pump sets including a pair of pumps connected in series between the source and one of the lines and operable to cause a flow of fluid from the source through the supply line, a by-pass around the second pump, a check valve in the by-pass preventing return flow of fluid through the by-pass while permitting forward flow, means operating cyclically to start both pump sets simultaneously, and means operating each time the pump sets are started to stop the operation of the second pump set only after an interval approximately sufficient for the flow of fluid from the source to the end of the supply line remote from the source.

3. A heating system, which comprises a source of heated fluid, a supply line leading from and a return line leading to the source, a plurality of radiators connected to the supply line to receive the heated fluid therefrom, a pair of pump sets including a pair of pumps connected in series between the source and one of the lines and operable to cause a flow of fluid from the source through the supply line, a by-pass around the second pump, a check valve in the by-pass preventing return flow of fluid through the by-pass while permitting forward flow, electrically actuated means operating cyclically to start both pump sets simultaneously, once per cycle, and a timer means operating to stop the second pump set only after an interval approximately sufficient for the flow of fluid from the source to the end of the supply line remote from the source.

4. A heating system, which comprises a source of heated fluid, a supply line leading from and a return line leading to the source, a plurality of radiators connected to the supply line to receive the heated fluid therefrom, a pair of pump sets including a pair of pumps connected in series between the source and one of the lines and operable to cause a flow of fluid from the source through the supply line, a by-pass around the first pump containing a manually operable shut-off valve, a by-pass around the second pump containing a check valve preventing return flow of fluid through said by-pass while permitting forward flow, electrically actuated means operating cyclically to start both pumps simultaneously, once per cycle, and means operating each time the pump sets are started to stop the second pump set only after an interval approximately sufficient for the flow of fluid from the source to the end of the supply line remote from the source.

References Cited in the file of this patent

UNITED STATES PATENTS

| | | |
|---|---|---|
| 1,492,742 | Norton | May 6, 1924 |
| 2,342,211 | Newton | Feb. 22, 1944 |
| 2,546,358 | Duy | Mar. 27, 1951 |